United States Patent [19]

Katada et al.

[11] Patent Number: 4,992,936
[45] Date of Patent: Feb. 12, 1991

[54] ADDRESS TRANSLATION METHOD AND APPARATUS THEREFOR

[75] Inventors: Hisashi Katada, Sagamihara; Yasuhiro Inagami, Kodaira; Yoshiko Tamaki, Kunitachi; Shigeo Nagashima, Hachioji, all of Japan

[73] Assignee: Hitachi, Ltd., Tokyo, Japan

[21] Appl. No.: 269,058

[22] Filed: Nov. 9, 1988

[30] Foreign Application Priority Data

Nov. 11, 1987 [JP] Japan ................. 62-283279

[51] Int. Cl.$^5$ ............... G06Z 12/08; G06Z 12/10
[52] U.S. Cl. ................. 364/200; 364/254.9; 364/255.1; 364/255.7
[58] Field of Search ... 364/200 MS File, 900 MS File

[56] References Cited

U.S. PATENT DOCUMENTS

| | | | |
|---|---|---|---|
| 3,979,729 | 9/1976 | Eaton et al. | 364/200 |
| 4,079,453 | 3/1978 | Dahl | 364/200 |
| 4,453,212 | 6/1984 | Gaither et al. | 364/200 |
| 4,727,485 | 2/1988 | Keshlear et al. | 364/200 |

FOREIGN PATENT DOCUMENTS 62-73347 4/1987 Japan .

OTHER PUBLICATIONS

"Hitac Supercomputer S-820 Functional Description", Jun. 1987.
"Hitac S-820 Processor Manual", May 1988.

Primary Examiner—David Y. Eng
Attorney, Agent, or Firm—Antonelli, Terry, Stout & Kraus

[57] ABSTRACT

In a method and apparatus wherein a logical address of a main storage designated by a program is translated into a real address: an address translation table for each of a plurality of address translation sizes is prepared; the logical address designated by the program is fetched; an entry of an address translation table whose address translation size is larger than those of the other address translation tables among the plurality of address translation sizes is first identified based on the fetched logical address; a first information on an address translation size validity included in the first indentified entry is checked; address translation in units of translation size of the address translation table including the first identified entry is performed when the first information indicates valid; when the first information indicates invalid, an entry of an address translation table whose address translation size is next smaller than that of the address translation table including the first identified entry is second identified, based on the top address of the address translation table including the second identified entry and based on the fetched logical address; and address translation is further performed returning back to the above-mentioned step where the first information on the address translation size included in the first identified entry is checked.

16 Claims, 10 Drawing Sheets

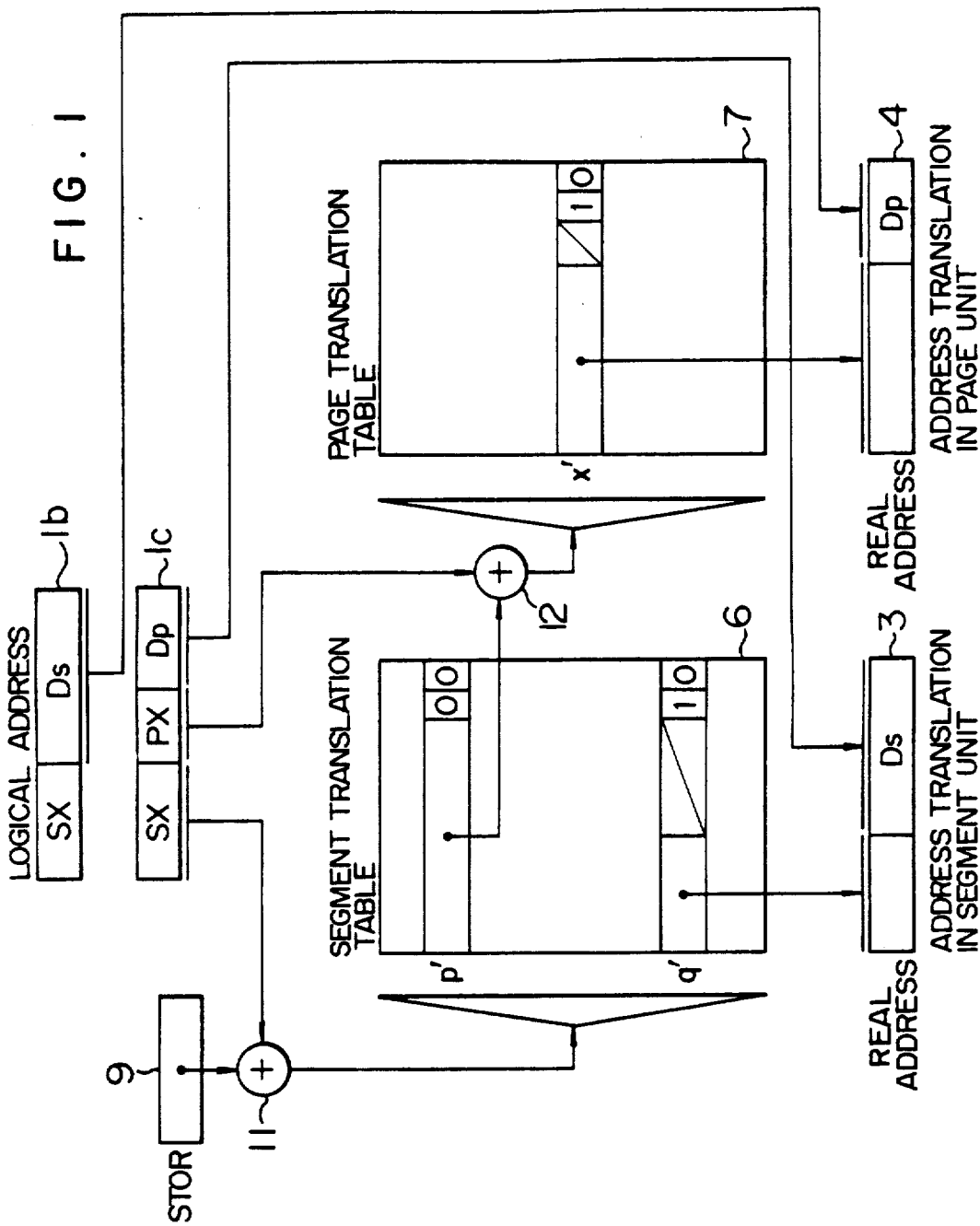

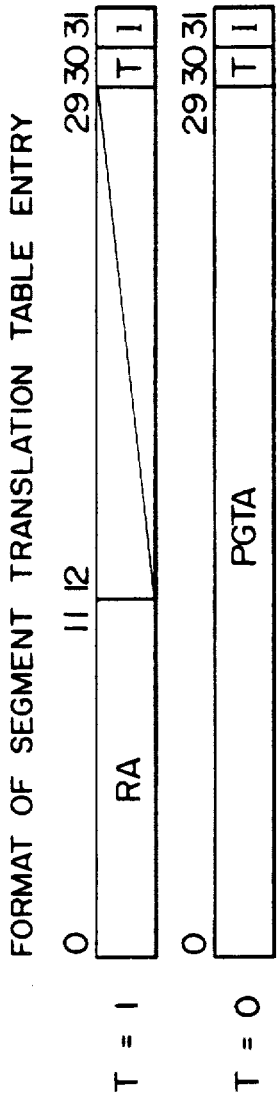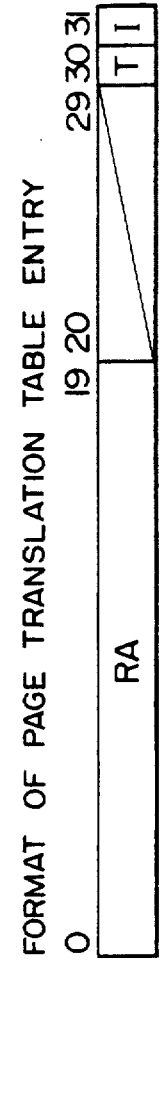
FIG. 7A FORMAT OF COMPARTMENT TRANSLATION TABLE ENTRY
FIG. 7B
FIG. 7C FORMAT OF SEGMENT TRANSLATION TABLE ENTRY
FIG. 7D
FIG. 7E FORMAT OF PAGE TRANSLATION TABLE ENTRY
T: ADDRESS TRANSLATION SIZE VALIDITY BIT
I: INVALID BIT
RA: REAL ADDRESS
SGTA: TOP ADDRESS OF SEGMENT TRANSLATION TABLE
PGTA: TOP ADDRESS OF PAGE TRANSLATION TABLE

ADDRESS TRANSLATION METHOD AND APPARATUS THEREFOR

BACKGROUND OF THE INVENTION

The present invention relates to a digital computer system, and more particularly, to an address translation method and an apparatus therefor capable of efficiently using a main storage.

Virtual memory systems are widely and commonly used for computer systems to realize superior function, performance and facility. In a virtual memory system, an address of a main storage indicated by a program is a logical address which is subjected to address translation by address translation facilities of the computer system. A real address obtained through address translation is used in accessing the main storage. Various address translation methods such as segmentation, paging and the like are employed, and a suitable one for a particular computer system is selected.

The concept of a virtual memory system and its particular example are described in various texts and documents.

Of various address translation methods with virtual memories, there is known a method wherein the address translation size can be changed with a program by including in the program status word (PSW) thereof a bit indicative of the address translation size, as disclosed in JP-A-62-73347.

An example of address translation in a supercomputer is disclosed in "HITAC Supercomputer S-820 Functional Description" pp. 19 to 21, July 1986 presented by the same assignee. In this address translation method, there are provided a segment relocation register for address translation in units of segment, and a page relocation register for address translation in units of page. Which size is to be used in address translation is determined by a bit, indicative of the address translation size, of a logical address within the segment relocation register. Namely, if the bit is 0, an entry of the segment relocation register is designated by the segment index field of a logical address, to perform address translation in units of segment. If the bit is 1, an entry of the page relocation register is designated by a combined portion of the segment and page index fields of a logical address, to perform address translation in units of page.

An analysis by the present inventors of the conventional address translation in a computer system disclosed in JP-A-62-73347 showed that the size (which is often called as segment size or page size, and 4 KB, 1 MB or the like has been adopted) of address translation is fixed in the computer system. Even if a plurality of sizes could be used selectively, the size is fixed for each program.

Consider the main storage control method for such a computer system. For example, in a scientific and mathematical use oriented computer system, address translation for a system control task is carried out in units of relatively small memory capacity, whereas address translation for scientific and mathematical use handling considerably large matrix data is carried out in units of relatively large memory capacity. Thus, not only the main storage can be efficiently used, but also the amount of translation tables required for address translation can be reduced (because of reverse proportion of the translation table amount relative to the address translation size), resulting in a simplicity of the main storage control. However, such appropriate main storage control cannot be realized by a conventional method wherein the address translation size cannot be cahnged dynamically within one program.

Further, in address translation of the computer system described in HITAC Supercomputer S-820 Functional Description, two types of sizes, i.e., segment and page, can be used selectively for each program. However, if it is intended to realize that the address size can be used selectively for a desired logical address, a page relocation register which covers the entirety of the logical address space must be provided so that a problem of extremely increasing the hardware quantity occurs. In the HITAC Supercomputer S-820, the logical addresses smaller than 16 MB are translated in units of page, whereas the logical addresses equal to or larger than 16 MB are translated in units of segment. Thus, the address translation size is ambiguously determined in accordance with the logical address, to thereby avoid an increase of hardware quantity. However, there arises a problem of the restriction that the translation size is selectively used on both sides of a predetermined fixed logical address.

SUMMARY OF THE INVENTION

It is an object of the present invention to provide an address translation method and an apparatus therefor in a computer system which processes several requirements different in nature, wherein an appropriate address translation size can be used selectively for each module different in nature of a program or task, or in other words an address translation size can be changed at an optional logical address within a program or task, while reducing the amount of translation tables required in such address translation.

It is another object of the present invention to provide an address translation method and an apparatus therefor capable of dynamically change the address translation size for a same logical address during executing a program.

According to one aspect of the present invention achieving the above objects, an address translation table is provided for each of a plurality of address translation sizes; a logical address indicated by a program is fetched; an entry of a first address translation table corresponding to an address translation size larger than the other address translation sizes among the plurality of address translation sizes, is first identified based on the fethed logical address; a first information on address translation size validity included in the first identified entry is checked; if the first information is valid, address translation is performed in units of the address translation size corresponding to the first address translation table including the first identified entry; if the first information is invalid, an entry of a second address translation table corresponding to an address translation size next smaller than the address translation size corresponding to the first address translation table including the first identified entry, is identified based on the top address, of the second address translation table, included in the first identified entry and based on the fetched logical address; and succeedingly the address translation process returns to the above-mentioned step whereat the first information on address translation size validity is checked.

BRIEF DESCRIPTION OF THE DRAWINGS

FIG. 1 is an explanatory diagram showing an embodiment of the address translation system according to the present invention;

FIGS. 7A to 7E show the examples of formats of an entry of the address translation table of the embodiment shown in FIG. 4;

DESCRIPTION OF THE PREFERRED EMBODIMENTS

Figure 2A:
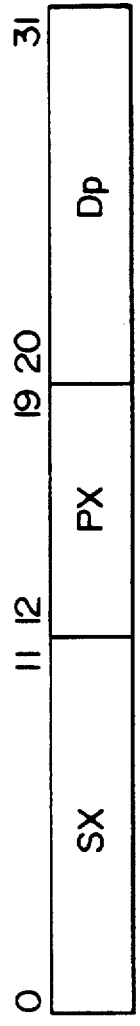
FIGS. 2A and 2B show the examples of formats representing a logical address of the embodiment shown in FIG. 1.

First, the address translation system of this invention will be generally described.

The contents of an address translation table are set by an operation system or the like which supervises the main storage, in accordance with the use requirements of the main storage. In particular, a correspondence between logical addresses and real addresses is registered, and information representative of address translation validity is set for each address translation size which is determined based on the nature of each task allocated to the virtual storage space. These processes are dynamically performed in response to the start and end of a task.

The address translation is performed in the following manner on the basis of the address translation table as set in the manner described above.

First, an entry of an address translation table corresponding to the largest address translation size is first identified using a logical address designated by a program. Next, the content of the first identified entry is checked. If the information representative of address translation size validity indicates valid, address translation from logical address into real address is performed using a real address portion stored in the first identified entry. If the information does not indicate valid, an entry of an address translation table having a smaller address translation size is identified using the top address of the address translation table stored in the first identified entry and the logical address designated by the program. Next, the content of the second identified entry is checked. The above processes are repeated until the information representative of address translation size validity indicates validity. Using the address translation size which has been determined as valid, address translation from logicl address into real address is performed.

As above, it becomes possible to process address translation while dynamically supervising the address translation size so as to make it suitable for each process requirement (task). In addition, where a larger address translation size is used for address translation, the address translation tables corresponding to smaller address translation sizes become unnecessary, thereby reducing the amount of address translation tables required for address translation, and simplifying the main storage control.

The address translation table of large translation size may be dynamically selected during program execution if desired, by changing from invalid to valid the information, representative of address translation size validity, in the entry of the address translation table of large translation size, setting information identifying a real address portion corresponding to a logical address therein, and by deleting the address translation table of small size.

Contrary to the above, the address translation table of small translation size may be dynamically selected during program execution if desired, by changing from valid to invalid the information, representative of address translation size invalidity, in the entry of the address translation table of large translation size, and setting information identifying an address translation table of small size corresponding to a logical address.

The details of the present invention will now be described in connection with the preferred embodiments.

Figure 2B:
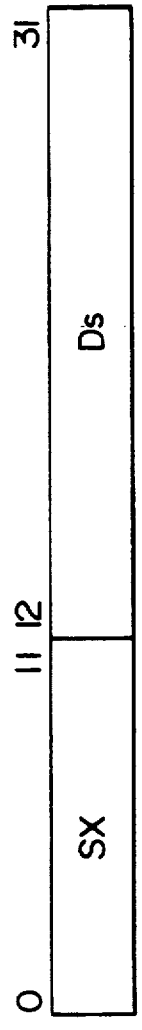

A method of designating a main storage address in the following embodiment will first be described. FIGS. 2A and 2B show the formats of a logical address in a first embodiment. The logical address is designated by 32 bit length. Assuming a byte unit addressing, an address space of 4 gigabytes (1 gigabyte is $2^{30}$ bytes, and is abbreviated as GB hereinafter) is structured. In this embodiment, segment or page can be selected as the address translation size. FIG. 2A shows the fields of a logical address where page is used as the translation unit. As shown in FIG. 2A, 12 bits from bit 0 to 11 represent a segment index (abbreviated as SX), 8 bits from bit 12 to 19 represent a page index (abbreviated as PX), and 12 bits from bit 20 to 31 represent an intrapage displacement (abbreviated as $D_p$). On the other hand, FIGS. 2B shows the fields of a logical address where segment is used as the translation unit, wherein 12 bits from bit 0 to 11 represent a segment index (abbreviated as SX) and 20 bits from bit 12 to 31 represent an intrasegment displacement (abbreviated as Ds). Namely, a segment covers an area in units of 1 megabyte (1 megabyte is $2^{20}$ bytes, and is abbreviated as MB hereinafter), whereas a page covers an area in units of 4 kilobytes (1 kilobyte is $2^{10}$ bytes, and is abbreviated as KB hereinafter). In the main storage of this embodiment, the total address space of 4 GB is constructed of 4096 segments each constructed of 256 pages.

The structure of address translation tables and the address translation system of this embodiment will be described with reference to FIG. 1.

Figure 3A:
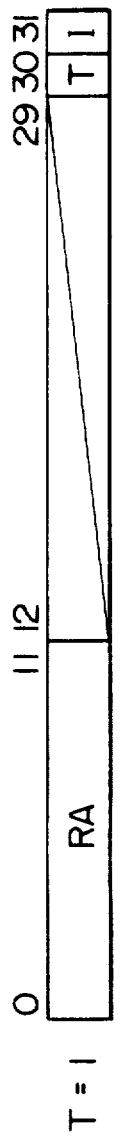
FIGS. 3A to 3C show the examples of format of an entry of the address translation table of the embodiment shown in FIG. 1.
Figure 3B:
Figure 3C:

In this embodiment, an address translation table is provided for each address translation size. Namely, there are provided a segment translation table for segment and a page translation table for page. Stored in each entry of the segment and page translation tables are a real address portion corresponding to a logical address or an address indicating the location of another address translation table, and information representative of validity or the like of the entry. The examples of an entry of the translation table is shown in FIGS. 3A to 3C. In these examples, an entry of the translation table is represented by 32 bit length, wherein 32 bits from bit 0 to 29 constitute a field for storing a real address portion or the top address of another address translation table, bit 30 is an address translation size validity bit T, and bit 31 is an invalid bit I. The meanings of these bits will be described next. The address translation size validity bit T is a bit to be used in supervising the address translation size.

This bit T indicates, when it takes a value 1, that the address translation size for the entry concerned is used as the unit of address translation, namely, if the entry now concerned is in the segment translation table, then segment is used as the unit of address translation. In particular, in case of an entry of the segment translation table, a total 32 bit real address is obtained by combining 12 bits (RA field) from bit 0 to 11 of the entry as shown in FIG. 3A as the real address portion from bit 0 to 11 corresponding to the logical address portion (SX field) from bit 0 to 11, to the remaining logical address portion (Ds field) of 20 bits from bit 12 to 31. In case of an entry of the page translation table, a total 32 bit real address is obtained by combining 20 bits (RA field) from bit 0 to 19 of the entry as the real address portion from bit 0 to 19 corresponding to the logical address portion (SX and PX fields) from bit 0 to 19, to the remaining logical address portion (Dp field) of 12 bits from bit 20 to 31.

The bit T indicates, when it takes a value 0, that address translation is performed using another address translation size other than the size corresponding to the entry now concerned. In this case, the entry stores the top address (if now segment translation table is used, then PGTA) of an address translation table of smaller translation size (if now segment, then page) than that of the address translation table corresponding to the entry now concerened. Namely, the bit T of 0 indicates that address translation is performed using another address translation size other than the size corresponding to the entry now concerned, and that the entry stores the information (in case of segment translation table, PGTA) indicative of the location of another address translation table of smaller address translation size, by which information address translation is initiated through the other address translation table.

The invalid bit I indicates, when it takes a value of 0, that the information in the entry has a meaning, and indicates, when it takes a value of 1, that the information in the entry is invalid. This bit I provides simple means for indicating that the area within the virtual storage space corresponding to that entry is not present in the real storage.

Although not shown in this embodiment, each entry may be provided with other fields such as a bit indicating storage protection or the like.

The procedure of address translation in this embodiment will then be described with reference to FIG. 1. In FIG. 1, 1b and 1c denote logical addresses, 3 and 4 denote real addresses. The real addresses 3 and 4 have as their address translation sizes, segment and page, respectively. 6 and 7 denote address translation tables which are used in the address translation procedure. Each of the address translation tables 6 and 7 has the table entry format as shown in FIGS. 3A to 3C. An address translation table is provided for each address translation size. The address translation table 6 is a segment translation table for address translation in units of segment, whereas the address translation table 7 is a page translation table for address translation in units of page. These address translation tables are stored generally in the main storage, however, they may be stored in specific storage area such as registers. 9 denotes a segment table origin register (STOR) for storing a location (main storage address if the table is stored in the main storage) of the segment translation table, which STOR provides means for switching an address space in order to realize a multi virtual storage as in a conventional computer system. 11 and 12 denote adders.

The following detailed, particular description of the address translation procedure is based on the following assumptions which are generally set by a system software such as an operating system.
(1) A logical address with SX field of p, PX field of x and Dp field of n is subjected to address translation with an address translation size of page. The entries of the segment and page translation tables used by such a logical address are p' and x', respectively.
(2) A logical address with SX field of q and Ds field of m is subjected to address translation with an address translation size of segment. An entry of the segment translation table used by such a logical address is q'.
(3) The contents of the segment and page translation tables are set so as to satisfy the above assumptions (1) and (2).

The procedure of obtaining a real address from a designated logical address with SX field of q and Ds field of m will be described. First, the content of STOR 9 and the value q of SX field are added together to identify an entry q' of the segment translation table for the designated logical address. The content of the entry is then checked. The invalid bit I of the entry is 0 and the address translation size validity bit T is 1 so that segment is selected as the address translation size for the designated logical address. Then, the bits from bit 0 to 11 of the logical address (SX field) are replaced by 12 bits from bit 0 to 11 of the entry q', to obtain a real address 3.

The procedure of obtaining a real address from a designated logical address with SX field of p, PX field of x and Dp field of n will be described. Similar to the above-described case, an entry p' of the segment translation table used by the designated logical address is identified based on the content of STOR 9 and the value p of SX field. The invalid bit I of the entry p' is 0 and the address translation size validity bit T is 0 so that it is recognized that the address translation size is not segment. Therefore, a page translation table is then referred to. The top address of the page translation table to be referred to is stored in the entry p' of the segment translation table at the area from bit 0 to 20. The sum of the top address value and the value x of PX field of the logical address is used to identify the entry x' of the page translation table. The invalid bit I of the entry x' is 0 and the address translation size validity bit T is 1 so that it is recognized that the address translation size is page. Then, the bits from bit 0 to 19 (SX and PX fields) of the logical address are replaced by 20 bits from bit 0 to 19 of the entry x', to obtain a real address 4.

In the above description for address translation procedure, if the contents of the address translation tables have been set as or found contradictory such that the values of address translation size validity bits in several address translation tables to be used by a single logical address are all 0, or the values include two or more 1s, then the integrity may be improved with means for generating an interruption through an exception process such as address translation exception.

The first embodiment has been described for the case of a logical address constructed of three fields: segment index field (SX), page index field (PX) and intrapage displacement (Dp).

Figure 6A:
FIGS. 6A to 6C show the examples of formats representing a logical address in the embodiment shown in FIG. 4.
Figure 6B:
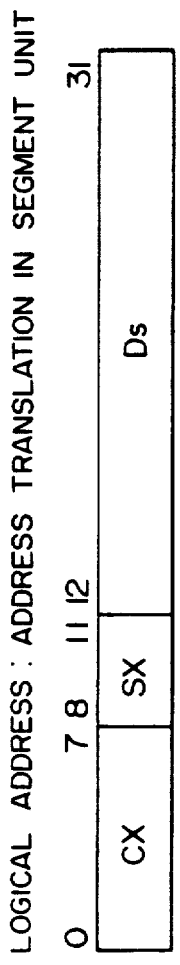
Figure 6C:
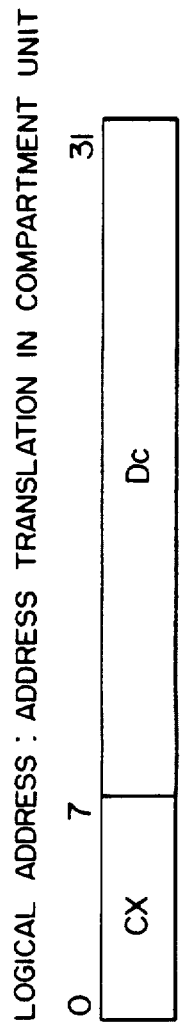
Figure 8:
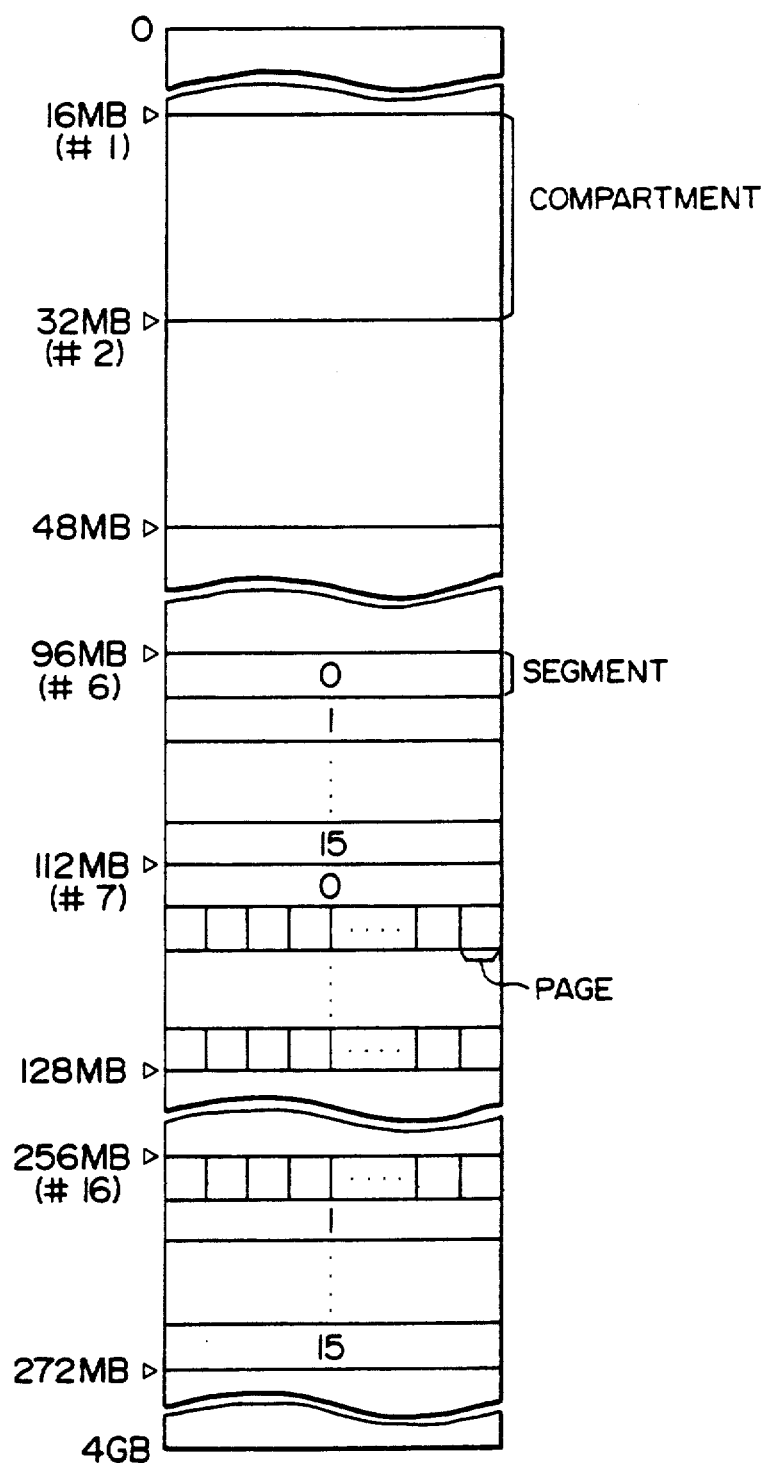
FIG. 8 is a memory map for explaining the main storage supervision in the embodiment shown in FIG. 4.

A method of designating a main storage address in the following embodiment will now be described. FIGS. 6A and 6B show the formats of a logical address in a second embodiment. The fields of a logical address using page as the translation unit are shown in FIG. 6A. As shown in FIG. 6A, 8 bits from bit 0 to 7 of the 32 bit length address represent a compartment index (abbreviated as CX), 4 bits from bit 8 to 11 represent a segment index (abbreviated as SX), 8 bits from bit 12 to 19 represent a page index (abbreviated as PX), and 12 bits from bit 20 to 31 represent an intrapage displacement (abbreviated as Dp). On the other hand, the fields of a logical address using segment as the translation unit is shown in FIG. 6B. As shown in FIG. 6B, 8 bits from bit 0 to 7 represent a compartment index (CX), 4 bits from bit 8 to 11 represent a segment index (SX), and 20 bits from bit 12 to 31 represent intrasegment displacement (abbreviated as Ds). The fields of a logical address using compartment as the translation unit is shown in FIG. 6C. As shown in FIG. 6C, 8 bits from bit 0 to 7 represent a compartment index (CX), and 24 bits from bit 8 to 31 represent intracompartment displacement (Dc). Namely, a compartment covers an area in units of 16 MB, a segment covers an area in units of 1 MB, and a page covers an area in units of 4 KB. In the main storage of this embodiment, the total address space of 4 GB is constructed of 256 compartments each of which is constructed of 16 segments each constructed of 256 pages.

Figure 4:
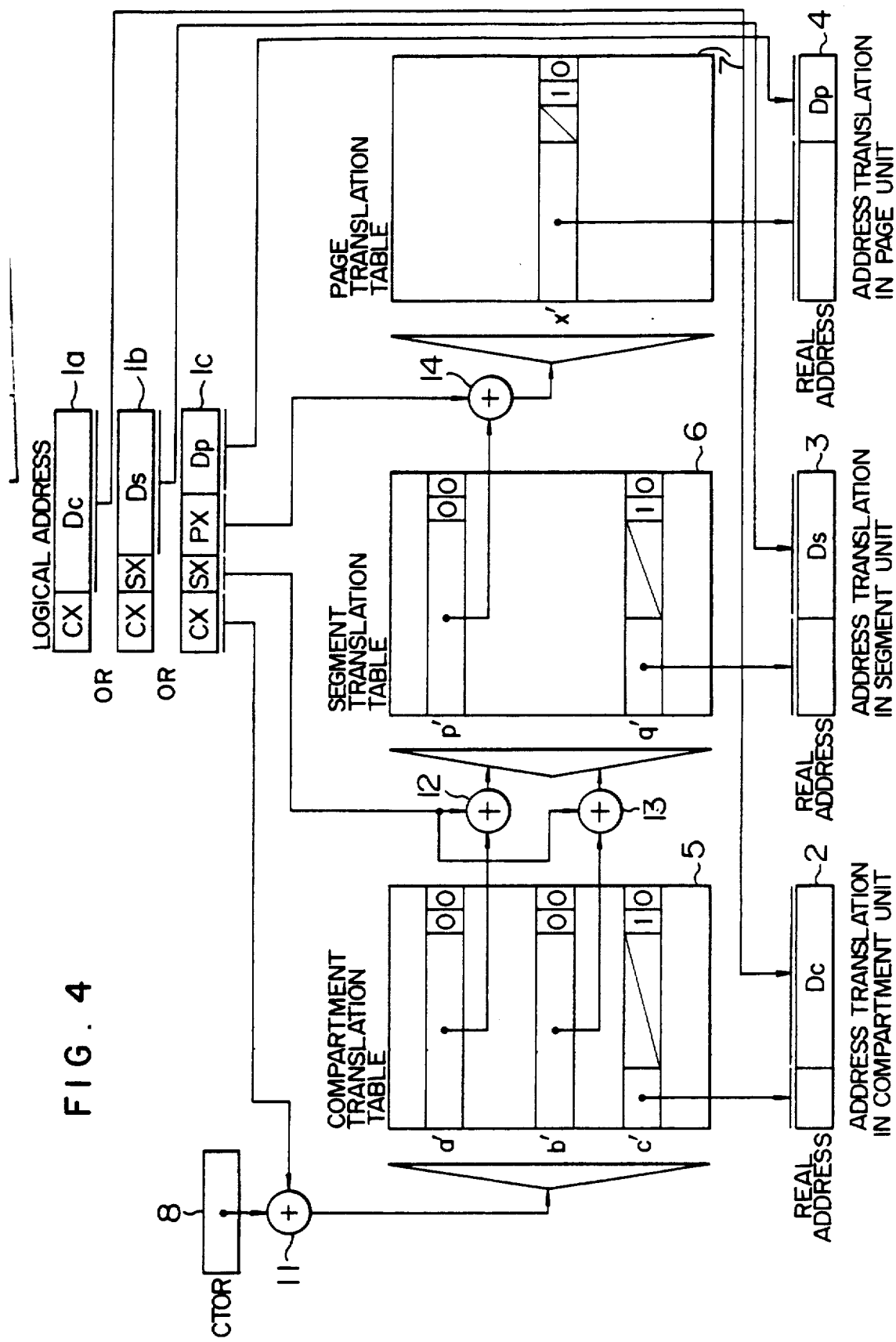
FIG. 4 is an explanatory diagram showing another embodiment of the address translation system according to the present invention.

The structure of the address translation table and the address translation system of this embodiment will be described with reference to FIG. 4.

In this embodiment, an address translation table is provided for each address translation size. Namely, there are provided a compartment translation table for compartment, a segment translation table for segment and a page translation table for page. Stored in each entry of the segment and page translation tables are a real address portion corresponding to a logical address or an address indicating the location of another address translation table, and information representative of validity or the like of the entry. The examples of an entry of the translation table is shown in FIGS. 7A to 7E. In these examples, an entry of the translation table is represented by 32 bit length, wherein 32 bits from bit 0 to 29 constitute a field for storing a real address portion or the top address of another address translation table, bit 30 is an address translation size validity bit T, and bit 31 is an invalid bit I. The meanings of these bits will be described next. The address translation size validity bit T is a bit to be used in supervising the address translation size.

This bit T indicates, when it takes a value 1, that the address translation size for the entry concerned is used as the unit of address translation, namely, if the entry now concerned is in the segment translation table, then segment is used as the unit of address translation. In particular, in case of an entry of the compartment translation table, a total 32 bit real address is obtained by combining 8 bits from bit 0 to 7 as the real address bits from 0 to 7 corresponding to the logical address bits from bit 0 to 7 (CX field), to the remaining logical address bits from bit 8 to 31 (Dc field). In cae of an entry of the segment translation table, a total 32 bit real address is obtained by combining 12 bits (RA field) from bit 0 to 11 of the entry as shown in FIG. 3A as the real address portion from bit 0 to 11 corresponding to the logical address portion (CX and SX fields) from bit 0 to 11, to the remaining logical address portion (Ds field) of 20 bits from bit 12 to 31. In case of an entry of the page translation table, a total 32 bit real address is obtained by combining 20 bits (RA field) from bit 0 to 19 of the entry as the real address portion from bit 0 to 19 corresponding to the logical address portion (SX and PX fields) from bit 0 to 19, to the remaining logical address portion (Dp field) of 12 bits from bit 20 to 31.

The bit T indicates, when it takes a value 0, that address translation is performed using another address translation size other than the size corresponding to the entry now concerned. In this case, the entry stores the top address (if now compartment translation table is used, then SGTA, or if now segment translation table is used, then PGTA) of an address translation table of smaller translation size (if now compartment, then segment, or if now segment, then page) than that of the address translation table corresponding to the entry now concerned. Namely, the bit T of 0 indicates that address translation is performed using another address translation size other than the size corresponding to the entry now concerned, and that the entry stores the information indicative of the location of another address translation table of smaller address translation size, by which information address translation is initiated through the other address translation table.

Similar to the first embodiment previously described, the invalid bit I indicates, when it takes a value of 0, that the information in the entry has a meaning, and indicates, when it takes a value of 1, that the information in the entry is invalid. This bit I provides simple means for indicating that the area within the virtual storage space corresponding to that entry is not present in the real storage.

The procedure of address translation in this embodiment will then be described with reference to FIG. 4. In FIG. 4, 1a to 1c denote logical addresses, 2 to 4 denote real addresses. The real addresses 2 to 4 have as their address translation sizes, compartment, segment and page, respectively. 5 to 7 denote address translation tables which are used in the address translation procedure. Each of the address translation tables 6 and 7 has the table entry format as shown in FIGS. 7A to 7E. An address translation table is provided for each address translation size. The address translation table 5 is a compartment translation table for address translation in units of compartment, the address translation table 6 is a segment translation table for address translation in units of segment, and the address translation table 7 is a page translation table for address translation in units of page. These address translation tables are stored generally in the main storage, however, they may be stored in specific storage area such as registers. 8 denotes a compartment table origin register (CTOR) for storing a location (main storage address if the table is stored in the main storage) of the segment translation table, which CTOR provides means for switching an address space in order to realize a multi virtual storage as in a conventional computer system. 11 to 14 denote adders.

The following detailed, particular description of the address translation procedure is based on the following assumptions which are generally set by a system software such as an operating system.

(1) A logical address with CX field of a, SX field of p, PX field of x and Dp field of n is subjected to address translation with an address translation size of page. The entries of the compartment, segment and page translation tables used by used a logical address are a', p' and x', respectively.

(2) A logical address with CX field of b, SX field of q and Ds field of m is subjected to address translation with an address translation size of segment. The entries of the compartment and segment translation tables used by such a logical address are b' and q'.

(3) A logical address with CX field of c and Dc field of 1 is subjected to address translation with an address translation size of compartment. The entry of the compartment translation table used by such a logical address is c'.

(4) The contents of the compartment, segment and page translation tables are set so as to satisfy the above assumptions (1) to (3) prior to the start of program execution.

Figure 5:
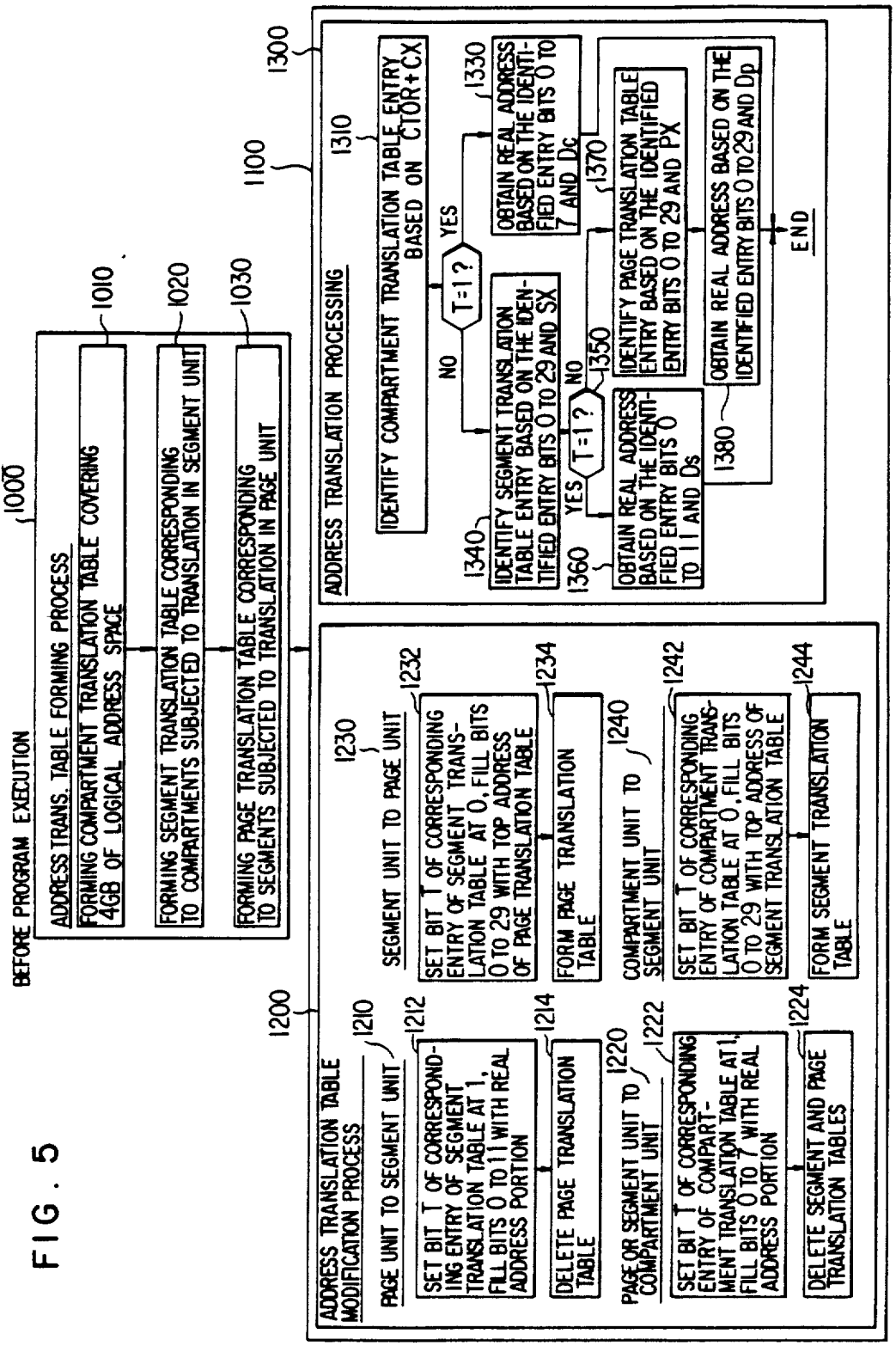
FIG. 5 is a flow chart for explaining, in the embodiment shown in FIG. 4, the processes of forming an address translation table, the processes of modifying an address translation table, and the processes of address translation.

The above process flow is shown in FIG. 5. Prior to the start of program execution, a system software such as an operating system performs an address translation table forming process (1000). First, a compartment translation table covering the logical address space of 4 GB is formed by setting necessary information regarding 256 entries including a', b' and c' (1010). Namely, as shown in FIGS. 7A and 7B, in case of address translation in units of compartment, a real address is set in the entry bits from bit 0 to 7 with bit T being set at 1 and bit I at 0. In case of address translation in units of segment or page, the top address of a segment translation table is set in the entry bits from 0 to 29 with bit T being set at 0 and bit I at 0. Second, segment translation table is formed for each compartment using segment or page as the translation unit (1020). Namely, as shown in FIGS. 7C and 7D, in case of address translation in units of segment, a real address is set in the entry bits from 0 to 11 with bit T being set at 1 and bit I at 0. In case of address translation in units of page, the top address of a page translation table is set in the entry bits from 0 to 29 with bit T being set at 0 and bit I at 0. Lastly, a page translation table is formed for each segment using page as the translation unit (1030). As above, only the necessary translation tables are formed so that the capacity of the main storage required by the tables can be economized.

The address translation process (1300) during the program execution process (1100) will be described with reference to FIG. 5.

The procedure of obtaining a real address from a logical address with CX field of c and Dc field of 1 will be described. A sum of the content of CTOR 8 and the value c of CX field is used to identify the entry c' of the compartment translation table corresponding to the designated logical address (1310). The content of the entry is checked. Of the entry, the invalid bit I is 0 and the address translation size validity bit T is 1 so that compartment is used as the address translation size for the designated logical address. Therefore, the logical address bits from bit 0 to 7 (CX field) are replaced by 8 bits from bit 0 to 7 of the entry, to obtain a real address 2 (1330).

The procedure of obtaining a real address from a designated logical address with CX field of b, SX field of q and Ds field of m will be described. First, the content of CTOR 8 and the value b of CX field are added together to identify an entry b' of the compartment translation table for the designated logical address (1310). The content of the entry is then checked. The invalid bit I of the entry is 0 and the address translation size validity bit T is 1 (1320) so that is recognized that the address translation size is not compartment. Then, a segment translation table is referred to. The top address to the segment translation table to be referred to is stored in the bit area from bit 0 to 29 of the entry b' of the compartment table now concerned. The top address is added to the value q of SX field to identify the entry q' of the segment translation table corresponding to the designated logical address (1340). The content of the entry q' is checked. Of the entry, the invalid bit I is 0 and the address translation size validity bit is 1 (1350) so that segment is selected as the address translation size for the designated logical address. Then, the bits from bit 0 to 11 of the logical address (CX and SX fields) are replaced by 12 bits from bit 0 to 11 of the entry q', to obtain a real address 3 (1360).

The procedure of obtaining a real address from a designated logical address with CX field of a, SX field of p, PX field of x and Dp field of n will be described. Similar to the above described case, an entry a' of the compartment translation table used by the designated logical address is identified based on the content of CTOR 8 and the value a of CX field. The content of the entry is checked. The invalid bit I is 0 and the address translation size validity bit is 0 (1320) so that it is recognized that the address translation size is not compartment. Next, a segment translation table is referred to. Using the content in the bits from bit 0 to 29 of the entry of the compartment translation table and the value p of SX field of the logical address, the entry p' of the segment translation table to be referred to is identified (1340). The invalid bit I of the entry p' is 0 and the address translation size validity bit T is 0 (1350) so that it is recognized that the address translation size is not segment. Therefore, a page translation table is then referred to. The top address of the page translation table to be referred to is stored in the entry p' of the segment translation table at the area from bit 0 to 20. The sum of the top address value and the value x of PX field of the logical address is used to identify the entry x' of the page translation table (1370). The invalid bit I of the entry x' is 0 and the address translation size validity bit T is 1 so that it is recognized that the address translation size is page. Then, the bits from bit 0 to 19 (SX and PX fields) of the logical address are replaced by 20 bits from bit 0 to 19 of the entry x', to obtain a real address 4 (1380).

In the above description for address translation procedure, if the contents of the address translation tables have been set as or found contradictory such that the values of address translation size validity bits in several address translation tables to be used by a single logical address are all 0, or the values include two or more 1s, then the integrity may be improved with means for generating an interruption through an exception process such as address translation exception.

The address translation procedure has been given in detail in the above. Next, a main storage supervision procedure with the address translation size dynamically changed using several address translation tables shown in FIG. 4 will be described in particular with reference to the address translation table modification process (1200) shown in FIG. 5.

FIG. 8 shows a virtual memory space map at a certain time. In this case, the area (CX field is 1 or 2 in decimal) from 16 MB to 48 MB of the logical address is assigned to a large scale arithmetic calculation program so that address translation is adapted to be performed in units of compartment. An area (CX field is 6 in decimal) from 96 MB to 112 MB of the logical address is assigned to a middle scale program so that address translation is adapted to be performed in units of segment. An area (CX field is 7 or 16 in decimal) from 112 MB to 128 MB or from 256 MB to 272 MB of the logical address is assigned to a system control program group so that address translation is adapted to be performed in units of segment or page in dependence of the nature of each program. For instance, address translation is adapted to be performed in units of segment for the first portion of 1 MB (SX field is 0) within the area from 112 MB to 128 MB, and in units of page for the remaining portion of 15 MB (SX field is 1 to 15 in decimal), whereas within the area from 256 MB to 272 MB, in units of page for the first 1 MB (SX field is 0), and in units of segment for the reamining 15 MB (SX field is 1 to 15 in decimal).

A system software such as an operating system prepares each address translation table as in the following:

(1) Compartment Translation Table

In the first and second entries, the address translation size validity bits T are set at 1, and the bits from bit 0 to 7 are set with real address portions of corresponding compartments.

In the 6-th, 7-th and 16-th entries, the address translation size validity bits T are set at 0, and the bits 0 to 29 are set with the real address portions of corresponding segment translation tables (which are abbreviated as ST-6, ST-7 and ST-16).

(2) Segment Translation Table

In each entry of ST-6, the address translation size validity bit is set at 1, and the bits 0 to 11 are set with the real address portions of corresponding segments.

Of the entries of ST-7, in the 0-th entry thereof, the address translation size validity bit is set at 1, and the bits 0 to 11 is set with a real address portion of a corresponding segment. In the 1-st to 15-th entries, the address translation size validity bits are set at 0, and the bits 0 to 29 are set with the top addresses of corresponding page translation tables.

Similarly, of the entries of ST-16, in the 0-th entry thereof, the address translation size validity bit is set at 0, and the top address of the corresponding page translation table is set therein. In the other entries, the address translation size validity bits are set at 1, and real address portions of corresponding segments are set therein.

(3) Page Translation Table

The entries of a page translation table are set as address translation in units of page. The address translation size validity bit in each entry is set at 1, and a real address portion of a corresponding page is set therein.

By providing each address translation table set as above, it becomes possible to perform address translation in accordance with the address translation size as indicated in the map shown in FIG. 8.

It is unnecessary to prepare segment and page translation tables if a compartment translation table is used only for address translation in units of compartment, and page translation tables if a segment translation table is used only for address translation in units of segment.

It is now assumed that the program assigned to the logical address region from 112 MB to 128 MB becomes unnecessary during prosecution of address translation in accordance with the map shown in FIG. 8. In such a case, if a new large scale arithmetic calculation program is assigned to that region and the address size is changed to compartment, then the following processes are to be performed by the operating system (1220). In particular, the value of the address translation size validity bit T in the 7-th entry of the compartment translation table is changed from 0 to 1, and the bits 0 to 7 are set with the real address portion of a corresponding compartment (1222). Also, the segment and page translation tables (1222) formed to be used by that region are deleted (1224).

Further, for the case the address translation size, e.g., of the 15-th segment (SX field is 15 in decimal) in the logical address region from 256 MB to 272 MB, is to be changed from segment to page (1230), the value of the address translation size validity bit of ST-16 (a segment translation table for the logical address region from 256 MB to 272 MB as described previously) is changed from 1 to 0, and the top address of the corresponding page translation table is set therein (1232), to thus form the corresponding page translation table (1234). The above processes are performed also in the case where the address translation size is changed from page to segment (1210) or from compartment to segment (1240).

As described in the above, the address translation size validity bit of each entry of an address translation table is properly set, and the real address portions are set in a minimum number of necessary address translation tables for each address translation size. Therefore, a different address translation size can be dynamically assigned to each region on the virtual memory.

Figure 9:
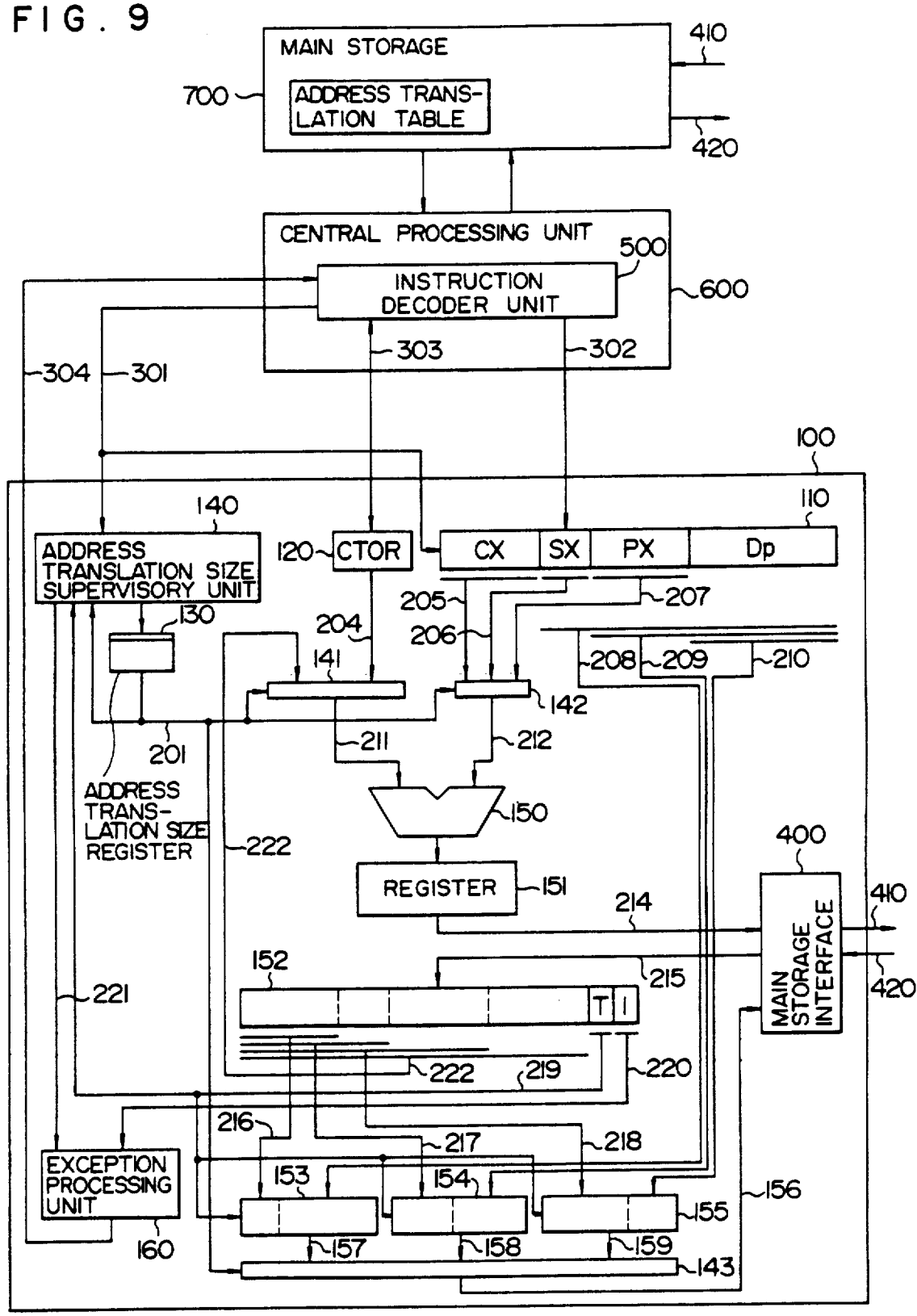
FIG. 9 is a block diagram showing an embodiment of the address translation circuit for realizing the address translation system according to the present invention.

Next, an embodiment of an address translation circuit realizing the address translation of this invention will be described with reference to FIG. 9.

Reference numeral 500 denotes an instruction decoder unit included in a central processing unit (CPU) 600, and reference numeral 100 denotes an address translator. The instruction decoder unit 500 is a circuit for reading an instruction and decoding it to output necessary signals to various control units in the address translator. The instruction decoder unit 500 does not constitute the characteristic feature of this invention, so the description therefor is omitted.

Next, the detail of the address translator 100 will be given.

After the instruction decoder unit 500 decodes an instruction and calculates a logical address of an operand to be used by the instruction, it sends an address translation start instruction via a signal line 301 to the address translator 100. Simultaneously therewith, the logical address calculated by the instruction decoder unit 500 is sent via a signal line 302 to the address translator 100. The logical address sent via signal line 302 is set at a register 110 in response to a set signal which is the address translation start instruction sent from signal line 301.

A register (CTOR) 120 is loaded with the top address of a compartment translation table. A read/write of the content of CTOR is effected in response to a read/write instruction, and the transfer of information is conducted via a signal line 303.

An address translation size register 130 is used to indicate which address translation size is selected for address translation. The register 130 stores one of the three conditions: namely (1) the address translation size is compartment, (2) the address translation size is segment, and (3) the address translation size is page.

An address translation size supervisory unit 140 has a function to set or change the condition of the register 130. Upon reception of the address translation start instruction from the instruction decoder unit 500 via signal line 301, the address translation size supervisory unit 140 initializes the condition of the register 130 into the condition of "the address translation size is compartment". The condition of the register 130 is reflected onto a signal line 201.

Figure 10:
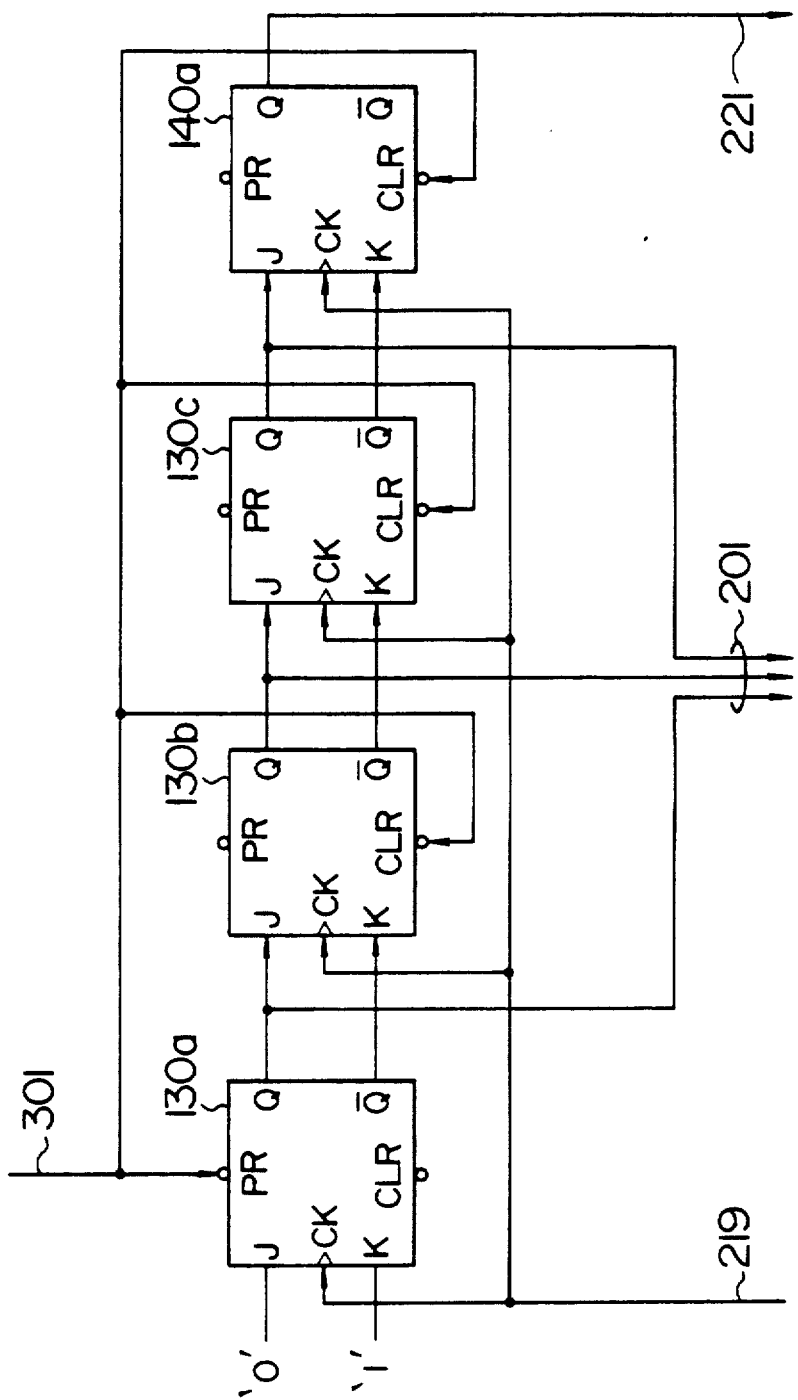
FIG. 10 shows the detail of the address translation size supervisory unit.

FIG. 10 shows the detail of an embodiment of the address translation size supervisory unit 140 and address translation size register 130. In FIG. 10, 130a to 130c denote a J-K flip-flop. Three J-K flip-flops 130a to 130c constitute the address translation size register 130. 140a denotes a J-K flip-flop. Signal lines 201, 219, 221 and 301 are the same signal lines as indicated by identical numbers in FIG. 9.

The J-K flip-flops 130a to 130c are initialized via signal line 301 into Q=1, Q=0 and Q=0, respectively in this order, and the initialized values are reflected onto signal ine 201 (PR denotes a preset terminal and is set at 1. CLR denotes a clear terminal and is set at 0). The J-K flip-flop 140a is initialized to Q=0. The condition of "100" corresponds to the condition of "the address translation size is compartment". Upon application of a signal to a clock (CK) terminal via signal line 219, the J-K flip-flop 130a with J=0 and K=1 is reset to Q=0, J-K flip-flop 130b with J=1 and K=0 is set to Q=1, and J-K flip-flop 130c with J=0 and K=1 remains as Q=0. Namely, the condition changes to the condition of "010". The condition of "010" corresponds to the condition of "the address translation size is segment". Upon application of a next signal to terminal CK via signal line 219, the J-K flip-flops 130a to 130c change their condition to "001" which corresponds to the condition of "the address translation size is page". Upon application of a further signal to terminal CK via signal line 219, the J-K flip-flop 140a is set from Q=0 to Q=1, thus setting a signal line 221 at 1.

Referring back to FIG. 9, reference numerals 204 to 210 denote signal lines. Signal lines 205, 206 and 207 reflect respectively the compartment index field (CX), segment index field (SX) and page index field (PX) of a logical address loaded in the register 110. Signal lines 208, 209 and 210 reflect respectively the SX field, PX field and Dp field, PX field and Dp field, and DP field of the logical address loaded in the register 110.

Reference numerals 141 to 143 denote selectors. A selector 141 selects one of the values on signal lines 222 and 204 to reflect it onto signal line 211. The selector 142 selects one of the values on signal lines 205, 206 and 207 to reflect it on signal line 212. The selector 143 selects one of the values on signal lines 157, 158 and 159 to reflect it on signal line 156. A selection control signal from the selectors 141 to 143 is the content of the register 130 which reflects the condition of signal line 201. If the condition of the register 130 is that "the address translation size is compartment", the selector 142 selects the value on signal line 204, the selector 142 selects the value (CX) on signal line 205, and the selector 143 selects the value on signal line 157. If the condition of the register 130 is that "the address translation size is segment", the selector 141 selects the value on signal line 222, the selector 142 selects the value (SX) on signal line 206, and the selector 143 selects the value on signal line 158. If the condition of the register 130 is that "the address translation size is page", the selector 141 selects the value on signal line 222, the selector 142 selects the value (PX) on signal line 207, and the selector 143 selects the value on signal line 159.

Reference numeral 150 denotes an arithmetic unit which calculates the address of an entry of the address translation table storing address translation information, based on the values reflected onto signal lines 211 and 212. In particular, the arithmetic unit 150 multiplies the value reflected onto signal line 212 by 4 (the size of an entry of the address translation table is 4 bytes so that the entry number is multiplied by 4 to obtain a relative address), and adds the result to the value reflected onto signal line 211. Reflected onto signal line 211 is the top address of the address translation table corresponding to the address translation size (the detail of which will be later described).

Reference numeral 151 denotes a register which stores the calculation result by the arithmetic unit 150. The content of the register 151 is reflected onto signal line 214 and sent to a main storage interface 400. The main storage interface 500 receives information, i.e., address information of the address translation table to be referred to, sent via signal line 214, and sends a reference request to the main storage 700 via signal line 410. In response to the reference request, the main storage 700 returns information present at the designated address to the main storage interface 400 via signal line 420. The above processes do not constitute the characteristic feature of this invention, so the detailed description therefor is omitted. The information sent back via signal line 420 is the content of the entry of the address translation table to be used in address translation. The main storage interface 400 sends the information via signal line 215 to a register 152.

The register 152 stores the content of the entry of the address translation table having been read as the address translation information. The formats of information stored in the register 152 are the same as shown in FIGS. 7A to 7E. Thus, the bit 30 of the register 152 is the address translation size validity bit T, and the bit 31 is the entry invalid bit I. The remaining bits store the real address portion (RA field) or the top address (SGTA or PGTA) of an address translation table of small address translation size. The contents of respective fields differ from each other dependent upon which size is used in address translation, as seen from FIGS. 7A to 7E. The content of RA field is reflected onto signal lines 216 to 218, the content of SGTA or PGTA is reflected onto signal line 222, the content of bit T is reflected onto signal line 219, and the content of bit I is reflected onto signal line 220. Signal line 216 reflects the content from bit 0 to bit 7 of the register 152, signal line 217 that from bit 0 to bit 11, and signal line 218 that from bit 0 to bit 19.

Reference numeral 160 denotes an exception processing unit which has a function to deal with an exception generated during the address translation process, and notify the instruction decoder unit 500 of the exception.

If the invalid bit I stored in the register 152 takes a value of 1, it means that the entry of the read-out address translation table is invalid so that an address translation exception should be generated. The exception processing unit 160 receives the value of bit I via signal line 220 and detects an address translation exception when the value of bit I is 1. Then, the exception processing unit 160 notifies the instruction decoder unit 500 of the exception via signal line 304.

Bit T set in the register 152 indicates whether the address translation size to be used by the present content of the register 130 is valied or not. If the value of bit T is 1, a real address portion is obtained from the content of RA field of the register 152. If the value of bit T is 0, the control changes to the address translation process which uses the address translation size smaller than the present address translation size.

Reference numerals 153, 154 and 155 each denote registers which are used for storing a real address resulted from address translation. The value of bit T reflected onto signal line 219 is used as a set signal from the registers 153, 154 and 155. If the value on signal line 219 is 1, the information of RA field of the register 152 reflected on signal lines 216 to 218 is combined with the information of part of the content of the register 110 reflected on signal lines 208 to 210, and the combined values are set in the registers 157 to 159. In particular, if the condition of the register 130 indicates that "the address translation size is compartment", the content of the bits from bit 0 to bit 7 of the register 152 (reflected onto signal line 216) is combined with the content of the bits from bit 8 to bit 31 of the register 110 (reflected onto signal line 208), and the combined value is set in the register 153. If the condition of the register 130 is that "the address translation size is segment", the content of the bits from bit 0 to bit 11 of the register 152 (reflected onto signal line 217) is combined with the content of the bits from bit 12 to bit 31 of the register 110 (reflected on signal line 209), and the combined value is set in the register 154. If the condition of the register 130 is that "the address translation size is page", the content of the bits from bit 0 to bit 19 of the register 152 (reflected onto signal line 218) is combined with the content of the bits from bit 20 to bit 31 of the register 110 (reflected onto signal line 210), and the combined value is set in the register 155. The information set in the registers 153 to 155 as above indicates real addresses resulted from the address translation. One of the real addresses set in the registers 153 to 155 is selected by a selector 143 and sent via signal line 156 to the main storage interface 400 to be used in access to the main storage. The above processes are performed if the value of bit T is 1.

If the value of bit T is 0, this value is reflected onto signal line 219 and sent to the address translation supervisory unit 140. The address translation supervisory unit 140 receives the value of bit T sent via signal line 219 and the content, i.e., the information of the presently valid address translation size, of the register 130 sent via signal line 201, determines the address translation size to be next selected in the following manner, and sets necessary information in the register 130:

(1) If signal line 201 indicates that "the address translation size is compartment", the address translation size to be next selected is segment so that "the address translation size is segment" is set in the register 130.

(2) If signal line 201 indicates that "the address translation size is segment", the address translation size to be next selected is segment so that "the address translation size is page" is set in the register 130.

(3) If signal line 201 indicates that "the address translation size is page", it is judged that none of the compartment, segment and page translation sizes were selected and that an exception condition occurred. An exception condition is notified via signal line 221 to the exception processing unit 160 which in turn notifies the exception condition via signal line 304 to the instruction decoder unit 500.

In the case of (1) and (2), a new address translation size is set in the register 130, and the address translation process described so far is continuously performed. In the case of (3), it means that all of the compartment, segment and page translation tables were referred to but there was no designation of a valid address translation size. Thus, an exception is detected which is notified to the instruction decoder unit 500.

As seen from the foregoing description of the present invention, in a computer system which processes several requirements different in nature, even if various programs (tasks) are allocated on the main storage, a proper address translation size can be selected at any desired logical address in dependence upon the nature of each program, and also the address translation size can be dynamically changed in accordance with the condition of program processing. Therefore, the main storage control can be realized efficiently, and the amount of address translation tables required for address translation can be made minimum.

We claim:

1. A method of translating a logical address of a main storage designated by a program into a real address, comprising:
   a first step of preparing an address translation table for each of a plurality of address translation sizes;
   a second step of fetching said logical address designated by said program;
   a third step of first identifying an entry of an address translation table whose address translation size is larger than those of the other address translation tables among said plurality of address translation sizes, based on said fetched logical address;
   a fourth step of checking a first information on an address translation size validity included in said first identified entry;
   a fifth step of performing address translation in units of translation size of said address translation table including said first identified entry, when said first information incidates valid;
   a sixth step of second identifying, when said first information indicates invalid, an entry of an address translation table whose address translation size is next smaller than that of said address translation table including said first identified entry, based on the top address of said address translation table including said second identified entry and based on said fetched logical address; and
   a seventh step of performing said fourth step after said sixth step.

2. A method as set forth in claim 1, further comprising:
   an eighth step of changing said first information from invalid to valid, said first information being included in a further entry of an address translation table corresponding to a desired address translation size except the smallest address translation size among said plurality of address translation sizes;
   a ninth step of setting a real address portion corresponding to said fetched logical address in said further entry; and a tenth step of deleting an address translation table corresponding to the address translation size smaller than said desired address translation size.

3. A method as set forth in claim 1, further comprising:
an eighth step of changing said first information from valid to invalid, said first information being included in a further entry of an address translation table corresponding to a desired address translation size except the smallest address translation size among said plurality of address translation sizes;
a ninth step of setting a top address of an address translation table whose address translation size is next smaller than said desired address translation size in said further entry; and
a tenth step of preparing said address translation table whose address translation size is next smaller than said desired address translation size.

4. A method of translating a logical address of a main storage designated by a program into a real address, comprising:
a first step of preparing first and second address translation tables corresponding to first and second address translation sizes, the second address translation size being smaller than the first address translation size, wherein each entry of said first table includes a first information indicating if said first address translation size is valid or invalid, and a second information which identifies a real address portion corresponding to said logical address for the case where said first information indicates valid, and identifies said second table for the case where said first information indicates invalid, and each of said second table includes a real address portion corresponding to said logical address;
a second step of fetching said logical address designated by said program, wherein said logical address includes one of a third information and a fourth information, said third information identifying an entry of said first table corresponding to said logical address, and said fourth information identifying said third information and an entry of said second table corresponding to said logical address;
a third step of identifying one entry of said first table corresponding to said fetched logical address, based on said third information;
a fourth step of checking said first information included in said identified one entry, in order to determine if said first address translation size is valid or invalid;
a fifth step of performing, if said first information indicates valid: address translation in units of said first address translation size, based on said real address portion included in said identified one entry; and
a sixth step of identifying, if said first information indicates invalid, said second table based on said second information, identifying an entry of said second table corresponding to said fetched logical address, based on said fourth information, and performing address translation in units of said second address translation size.

5. A method as set forth in claim 4, wherein said first and second address translation sizes are segment and page, respectively, and said first and second tables are segment and page translation tables, respectivley.

6. A method as set forth in claim 4, further comprising a seventh step of changing said first information in a desired entry of said first table from invalid to valid, setting a real address portion corresponding to said fetched logical address in said desired entry, and deleting said second table.

7. A method as set forth in claim 6, wherein said program includes information to be used in performing said seventh step.

8. A method as set forth in claim 4, further comprising a seventh step of changing said first information in a desired entry of said first table from valid to invalid, setting said second information identifying said second table in said desired entry, and preparing said second table.

9. A method as set forth in claim 8, wherein said program includes information to be used in performing said seventh setp.

10. A method of translating a logical address of a main storage designated by a program into a real address, comprising:
a first step of preparing first, second and third address translation tables corresponding to first, second and third address translation sizes, the third address translation size being smaller than the second address translation size, and the second address translation size being smaller than the first address tranlsation size, wherein each entry of each of said first and second tables includes a first information indicating if said corresponding address translation size is valid or invalid, and a second information which identifies a real address portion corresponding to said logical address for the case where said first information indicates valid, and identifies said table having a smaller address translation size than said first address translation size for the case where said first information indicates invalid, and each of said third table includes a real address portion coresponding to said logical address;
a second step of fetching said logical address designated by said program, wherein said logical address includes one of a third information, a fourth information, and fifth information, said third information identifying an entry of said first table corresponding to said logical address, said fourth information identifying said third information and an entry of said second table corresponding to said logical address, and said fifth information identifying said third and fourth information and an entry of said third table corresponding to said logical address;
a third step of identifying one entry of said first table corresponding to said fetched logical address, based on said third information;
a fourth step of checking said first information included in said identified one entry, in order to determine if said first address translation size is valid or invalid;
a fifth step of performing, if said first information indicates valid, address translation in units of said first address translation size, based on said real address portion included in said identified one entry;
a sixth step of identifying, if said first information indicates invalid, said second table based on said second information, and identifying an entry of said second table corresponding to said fetched logical address, based on said fourth information;
a seventh step of checking said second information included in said identified one entry, in order to determine if said first address translation size is valid or invalid;

an eighth step of performing, if said first information indicates valid, address translation in units of said second address translation size, based on said real address portion included in said identified one entry; and a ninth step of identifying, if said first information indicates invalid, said third table based on said second information, and identifying an entry of said third table corresponding to said fetched logical address, based on said fifth information, and performing address translation in units of said third address translation size.

11. A method as set forth in claim 10, wherein said first to third address translation sizes are compaetment, segment and page, respectively, and said first to third tables are compartment, segment and page translation tables, respectively.

12. A method as set forth in claim 11, further comprising a tenth step of changing said first information in a desired entry of said first or second table from invalid to valid, setting a real address portion corresponding to said fetched logical address in said desired entry, and deleting said second and third tables or said third table.

13. A method as set forth in claim 12, wherein said program includes information to be used in performing said tenth step.

14. A method as set forth in claim 11, further comprising a tenth step of changing said first information in a desired entry of said first table from valid to invalid, setting said second information identifying said second or third table in said desired entry, and preparing said second or third table.

15. A method as set forth in claim 14, wherein said program includes information to be used in performing said tenth step.

16. An address translator used in a computer system wherein a logical address of a main storage designated by a program is translated into a real address, and the main storage is referred to based on the real address, comprising:

said main storage storing address translation tables for a plurality of address translation sizes;

means for decoding an instruction and calculating the logical address of an operand to be used by said instruction;

means for storing said logical address;

first storage means for storing the top address of an address translation table whose address translation size is largest among said plurality of address translation sizes;

means for supervising which address translation size is to be used in address translation;

means responsive to said supervision means for selecting one of an output from said first storing means and a first signal, and selecting one of a plurality of outputs from said storage means, said plurality of outputs from said storage means being representative of index information on said plurality of address translation sizes of said logical address stored in said storage means;

means for claculating an address of an entry of an address translation table storing an address translation information, based on an output from said selection means;

register means for storing an output from said calculating means;

interface means responsive to said register means for outputting a reference request to said main storage and outputting the content of the entry read out from said main storage;

second storage means for storing the content of said read-out entry, said entry including one of a real address portion, said first signal representative of said top address of said address translation table having a smaller address translation size, and address translation size validity information; and means for generating a real address corresponding to said logical address of said operand, based on said real address portion stored in said second storage means and based on said one output selected by said selection means, wherein said supervision means responds to said address translation size validity information, and comprises means for actuating said real address generating means when said validity information indicates valid, and when said validity information indicates invalid, determining an address translation size to be next selected and supplying said determined address translation size to said calculating means.

* * * * *

UNITED STATES PATENT AND TRADEMARK OFFICE
CERTIFICATE OF CORRECTION

PATENT NO. : 4,992,936
DATED : February 12, 1991
INVENTOR(S) : KATADA, et al

It is certified that error appears in the above-identified patent and that said Letters Patent is hereby corrected as shown below:

Col. 16, Claim 1, line 47, delete "incidates"

and insert --indicates--.

Signed and Sealed this

Twenty-seventh Day of October, 1992

Attest:

DOUGLAS B. COMER

*Attesting Officer*  *Acting Commissioner of Patents and Trademarks*